ALBERT G. BODINE JR.
INVENTOR.

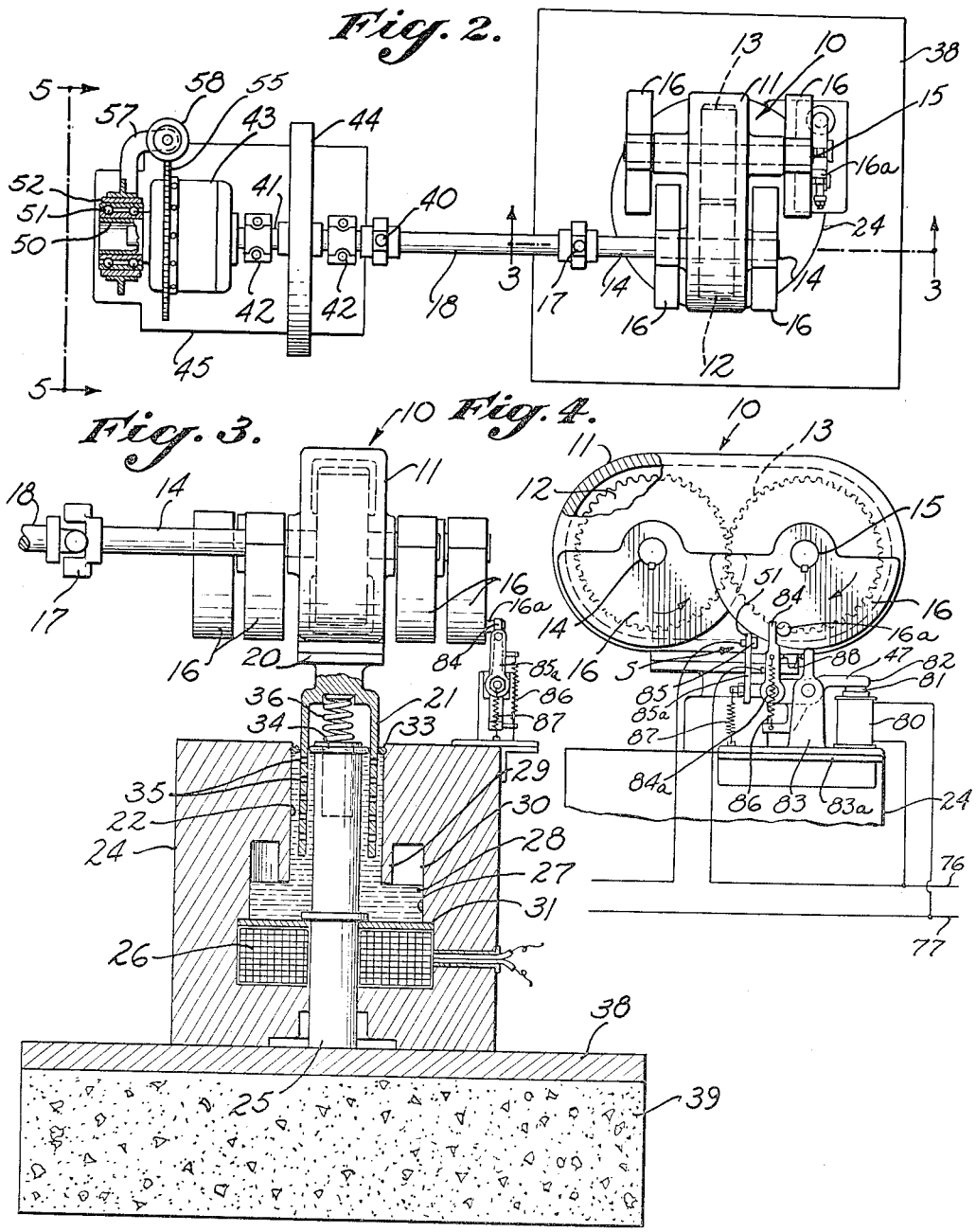

May 15, 1956  A. G. BODINE, JR  2,745,507
GEOPHYSICAL TRANSDUCER
Filed March 19, 1951  5 Sheets-Sheet 3
Fig. 5.
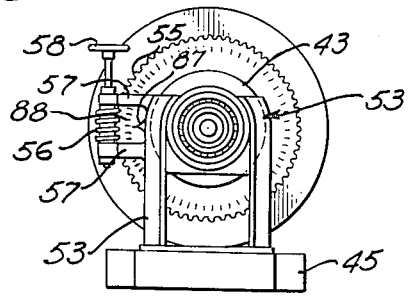
Fig. 6.
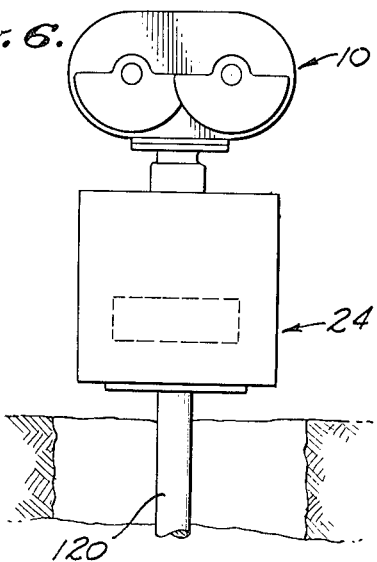
Fig. 7.
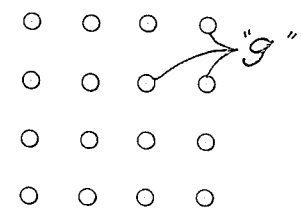
Fig. 8.
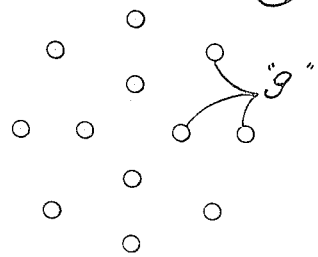
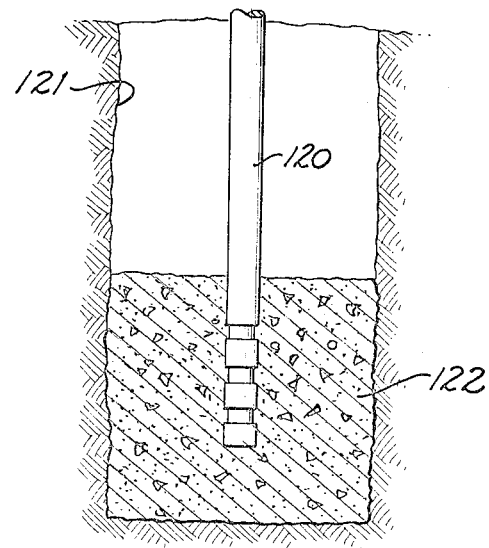
ALBERT G. BODINE JR.
INVENTOR.
BY
ATTORNEY.

May 15, 1956     A. G. BODINE, JR     2,745,507
GEOPHYSICAL TRANSDUCER

Filed March 19, 1951     5 Sheets-Sheet 5

INVENTOR.
ALBERT G. BODINE JR.
BY
ATTORNEY

United States Patent Office 2,745,507
Patented May 15, 1956

2,745,507

GEOPHYSICAL TRANSDUCER

Albert G. Bodine, Jr., Van Nuys, Calif.

Application March 19, 1951, Serial No. 216,442

25 Claims. (Cl. 181—.5)

This invention relates generally to the art of geophysical prospecting using artificial seismic waves, and is more particularly concerned with the provision of a system for forming and controlling the direction of propagation of a seismic wave beam, and for utilizing the beam or beams reflected back from underground strata for exploration and mapping of such strata.

Geophysical prospecting as heretofore practiced has commonly involved the propagation through the earth of a single pulse generated by setting off an explosion. The data obtained are generally simple time interval readings, the time interval being the lapsed time between the explosion and the reappearance of the impulse at the earth's surface after it has traveled down to a reflective stratum, been reflected, and traveled back up to the earth's surface again to a pick-up microphone or geophone. Comparison of time interval readings are then made for different locations on the earth's surface. This procedure however is cumbersome, crude, and very limited in usefulness.

Other systems have involved the use of continuous seismic waves, though still without directional beam effect. In these cases the waves have not been sufficiently powerful, as compared with those of the explosive charge system, to be of much usefulness, since the energy of the non-directional wave is dispersed over an ever-expanding spherical wave front.

An object of the present invention is the provision of a system for transmitting a directional seismic wave beam through the earth.

A further object is the provision of a simple and easily operable means for controlling the direction of the beam to make possible exploration of underground strata.

A still further object is a provision of pulse means for limiting the wave beam to a few cycles of time duration for a given measurement.

A still further object is the provision of a method and system for underground exploration of earth structure employing directional and controllable seismic wave beams of short time interval duration, and employing also a system for receiving the beam after reflection from underground structure and measuring the angle at which it is received for the purpose of evaluating the depth and inclination of the underground structure.

One of the basic concepts of the invention resides in the employment of an array of independently earth-coupled continuous wave seismic generators, spaced from one another over the area of the earth by distances equal at least to a quarter wave length of the wave generated in the earth. Thus assuming a wave frequency of twenty cycles per second, and a velocity in the earth of eight thousand feet per second, a wave length would be four hundred feet, and the generators would be spaced at least one hundred feet apart. One preferred spacing is three-quarters of a wave length, or three hundred feet for the example given. Assuming the ground surface, or plane of disposition of the several generators, to be perfectly horizontal and the generators to exert their wave generating forces in a vertical direction, it can readily be seen that if the generators are running in exact unison both in frequency and in phase, then the waves generated by the wave generators will combine to form a main beam which will be projected vertically downward. In this case, the waves from the several generators ultimately form a substantially flat wave front, which characterizes a beam, as distinguished from a spherical wave front from a single, or point, source of wave generation. If, however, one of the generators should have its phase adjusted to either lead or lag the other generators, its wave will have a corresponding time lead or lag with respect to the waves of the other generators, and in view of the generators being coupled to the earth independently of one another, the result will be that the flat wave front will be tipped accordingly. It follows, of course, that the projected beam tilts correspondingly, the beam always having a direction normal to the flat wave front created by the generators. A feature of the invention is accordingly the provision of means for controlling the direction of the main beam by controlling the phase relations between the several wave generators. It may be mentioned that such a system may also produce secondary "side" beams which introduce some confusion. These may be disregarded for the present, but will be dealt with hereinafter.

Another of the basic concepts of the invention resides in the use of beam "pulses" of very short time duration, as for instance of a very few cycles. It should be evident that this can be accomplished in various ways, for instance by elevating the wave generator from its engagement with the earth, by declutching the motor driving the wave generator, etc. I have, however, provided a novel and particularly effective decoupling means consisting of a magnetic clutch employed between the generator and a radiator means which is placed in engagement with the earth. This declutching means can be instantly coupled and decoupled while the generator is running at constant speed, permitting short duration pulses of fairly clean wave generation.

The invention in its entirety will be disclosed in the course of the following detailed description, taken in connection with the accompanying drawings, wherein:

Figure 2 is a plan view of one of the generator stations, parts being broken away to show in section;

Figure 3 is a view taken generally on line 3—3 of Figure 2, the generator remaining in elevation;

Figure 4 is a partial end elevational view of the generator looking at the same toward the left in Figure 3;

Figure 5 is a view taken in accordance with the line 5—5 of Figure 2;

Figure 6 is a view showing a modified form of the invention used when it is desired to apply the wave generating force to the earth's structure at a distance below the earth's surface;

Figure 7 is a diagrammatic view showing one suitable practical layout of an array of generators;

Figure 8 is a diagrammatic view showing a modified layout of an array of generators;

Figure 1:
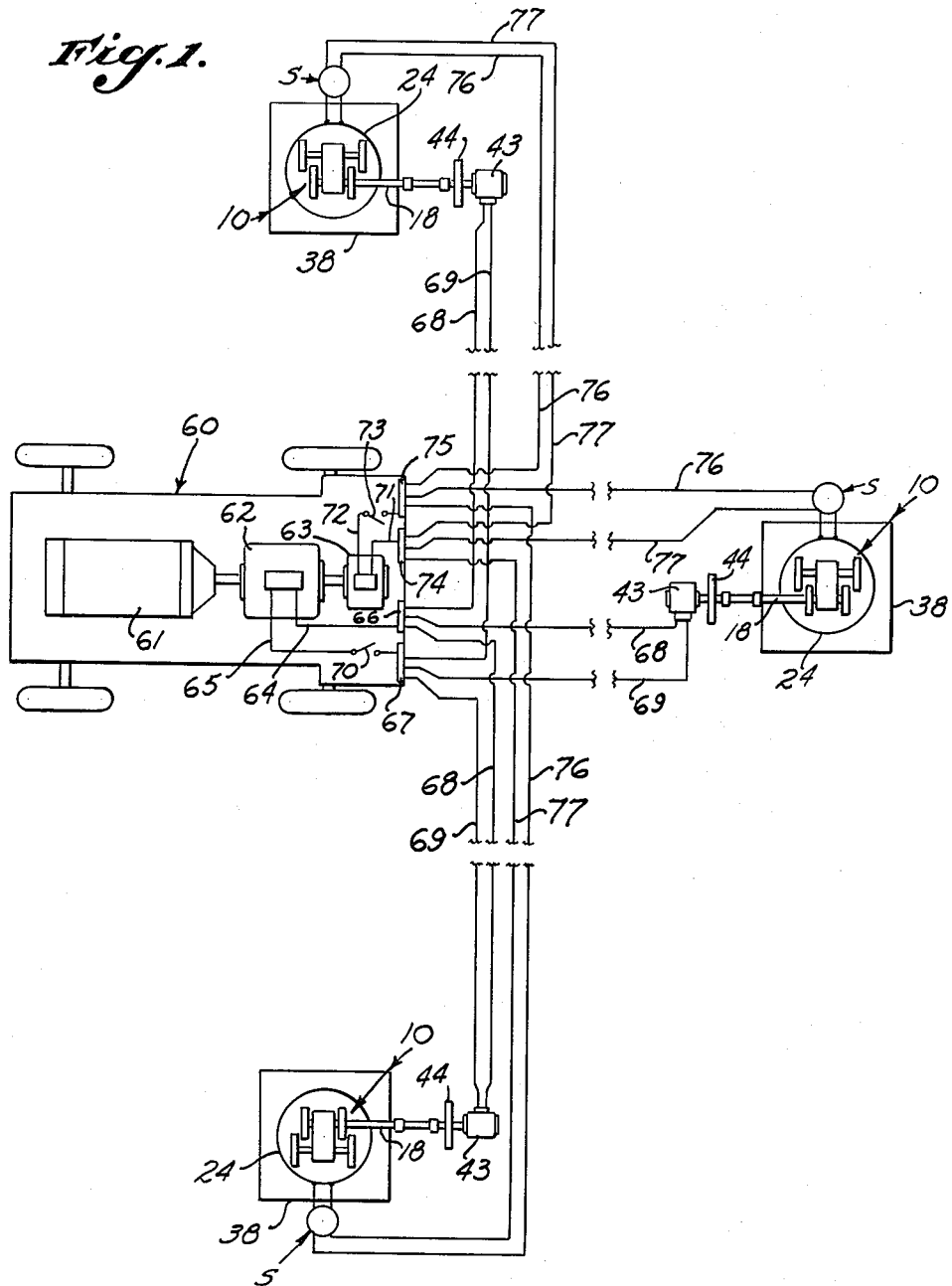
Figure 1 is a schematic view showing a plurality of wave generator stations in accordance with the invention, and showing also a central source of power for the several stations.

While the sound wave generator can obviously be of various types within the broad scope of the invention, I prefer to employ a type of generator using heavy rotating unbalanced weights, and an example of such a generator is shown in the drawings. With reference particularly to Figures 2, 3, and 4, the wave generator, generally designated by numeral 10, includes a housing 11 enclosing a pair of meshing spur gears 12 and 13, which are mounted on shafts 14 and 15, respectively, journaled in the side walls of housing 11. The shafts 14 and 15 project oppositely from the housing 11, and carry unbalanced weights such as 16, the weights carried by the shaft 14 being located inside of or between the weights carried by the shaft 15, as clearly shown in Figure 2, so as to avoid interference. The shaft 14 has a universal joint coupling 17 with a transmission shaft 18 driven as presently to be described. As will be seen from the drawings, the weights 16 are so placed on the shafts 14 and 15 that they will swing up and down in unison, so that the unbalanced forces generated by their rotation will be additive in the vertical direction. At the same time, the shafts 14 and 15, turning in opposite directions, cause horizontal components of force generated by the weights to cancel one another. Obviously, these results are gained when the weights are all located on their shafts as illustrated in Figures 3 and 4, that is to say, with the two weights of each pair at either side of the housing turning in opposite directions, and with all of the weights swinging up and down in unison. Powerful vertical force oscillations are generated by the device as described, while horizontal force components at the shafts are cancelled.

The housing of the generator 10 is mounted on a platform 20 at the upper end of a hollow cylindrical armature 21 of magnetic material, and the latter is received, with clearance, inside a cylindrical opening 22 extending downwardly into the top of the core of a pot magnet 24. The latter has a central vertical pole piece 25, surrounded by field winding 26, and above field winding 26 is a chamber 27 for magnetic fluid 28, the chamber 27 being of larger diameter than the previously mentioned cylindrical opening 22, and communicating therewith as indicated. The lower portion of the cylindrical opening 22 is defined by a wall 29, behind which is an air trap or surge chamber 30 located above the liquid level in chamber 28. Non-magnetic gland 31 is placed at the bottom of chamber 28 to seal the magnetic fluid against fluid leakage down to field winding 26.

The magnetic fluid 28 may be any suitable fluid which is subject to magnetic influences to serve the purpose of clutching the armature 21 rigidly to the core 24. In practice, this fluid may consist of oil carrying iron dust or filings, and a mixture of about fifty percent oil and fifty percent iron particles will serve.

The pole piece 25 will be seen to extend upwardly through the cylindrical armature 21 to the level of the top of core 24, and there is an annular space between the cylindrical armature 21 and the core 25 as well as an annular space between armature 21 and the wall 22 of core 24. The magnetic fluid fills these annular spaces, which are usually as close fitting as possible and which may be sealed near the top as by means of sealing rings indicated at 33 and 34. Preferably, the cylinder 21 is formed with a plurality of perforations 35, permitting the magnetic fluid to enter into the wall structure of the armature.

Normally, the generator 10 is supported by means of a coil compression spring 36 placed inside sleeve 21 and bearing between the upper end portion of armature 25 and the underside of the platform 20. This spring is sufficiently soft to prevent bothersome wave generation when the generator runs with the clutch "de-clutched."

The core 24 of the magnet is mounted on a radiator consisting of a rigid base plate 38 and a heavy reactive weight 39 such as a concrete base, resting directly on the earth. It is to be noted that each generator has its own individual base plate 38 and reactive weight 39. When the generator is in operation with the winding 26 of the coupling magnet de-energized, the housing 20 will oscillate vertically with reference to the magnet and base, the supporting spring 36 flexing accordingly. Energization of magnet 26, however, causes a strong magnetic flux in the annular gap between the core of the pot magnet and the pole piece, rigidizing the iron dust laden fluid, and thus locking the cylindrical armature 21 to the pot magnet. Accordingly, vertical force oscillations generated by the generator 10 will then be transmitted directly to the pot magnet 24 and thence to the base members 38 and 39 which are directly coupled to the earth's structure. The oscillating forces are thus applied to the earth.

The location of the vibratory motion clutch means between the generator and the coupling base is one of the principal features of this invention. This permits connecting and disconnecting at substantially fixed frequency. However, the magnetic fluid clutch may be substituted by other suitable selective engaging or clutching means.

The aforementioned transmission shaft 18 is coupled by universal joint 40 to a shaft 41 mounted in bearings 42 and driven by a synchronous motor 43. Shaft 41 preferably carries a flywheel 44, and the entire motor assembly is provided with a base 45 carrying the necessary supports for the shaft bearings and the motor 43.

In the illustrative embodiment of the invention, phase relations of the several generators of the system are regulated by angular adjustment of the stators of the synchronous motors which drive the generators. According to one illustrative embodiment shown in Figures 2 and 5, the housing of motor 43 is formed at one end with a tubular extension 50, supported by bearing 51 in a bearing race 52, which is in turn carried by supporting frame 53 mounted on base 45. Thus, instead of being fixedly mounted in the usual way, the housing 43, or stator, of the synchronous motor 43 is arranged for rotation on the motor axis. For securing such phase adjustment rotation, the housing of the motor 43 is shown to be equipped with a gear 55, in mesh with a worm gear 56 supported by stationary frame members 57 and operable by a hand wheel 58. By means of this hand wheel, the stator of the synchronous motor 43 can readily be adjusted through an arc of any extent up to 360°, although a 90° adjustment is usually sufficient for low frequency waves. The self-locking nature of the worm 58 will of course hold the stator in adjusted position.

Figure 1 shows an elementary field layout employing three of the wave generator units 10, spaced apart to cover a triangular area, with the distances between generators understood to be at least a quarter wave length of the generated wave in the earth—preferably about three-quarters of a wave length. The base 38 and coupling mass 39 of each generator will be understood to be placed in firm engagement with the earth. A central power station is provided, and may comprise a mobile unit 60 carrying a variable speed internal combustion engine 61 driving alternator 62 and also direct current generator 63. The output leads 64 and 65 from alternator 62 go to alternating current control panels 66 and 67, respectively, where they are distributed to feed lines 68 and 69 going to the input terminals of the several synchronous motors 43 driving the wave generators 10. The output lead 65 from the alternator is shown to contain a control switch 70.

Direct current generator 63 is similarly shown to have output leads 71 and 72, the latter containing control switch 73, which leads go to direct current control panels 74 and 75, respectively, where the direct current power is distributed by means of leads 76 and 77 to the field windings of the several pot magnets 24. Preferably, an automatic phase switch S, described presently, is incorporated in the power leads 76, 77 in order that the circuit to each pot magnet will be closed, while its armature is at zero velocity. Disregarding this additional switch for the moment, closure of switch 73 will be understood to energize the several pot magnets, coupling the wave generators 10 to the earth structure; while opening of switch 73 de-energizes the several magnets, and instantly decouples the wave generators from the earth structure.

It is generally desirable that the generator induce a "clean" wave form into the earth, and in order to assure that the generated wave will be clean from the start, it is desirable that the clutch engage near an end of the stroke movement of armature 21, where its velocity is substantially zero. While the clutch is disengaged there is a definite phase difference between the swing of the weights 16 and the movement of the armature 21, the weights usually swinging through the bottom of their path while the armature 21 is at the top of its stroke. Therefore, for convenience, I can choose the time that the weights are moving through the bottom of their path has the time to engage the clutch. A switching device for accomplishing this purpose will be described shortly.

When the multiple generator system of the invention is operating with a relative phase difference of a substantial number of degrees between the several generators, the clutches should not engage simultaneously, but rather, as nearly simultaneously as possible but with an individual adjustment to allow engagement of each clutch when its armature is near the end of its stroke. This purpose can be accomplished automatically by use of the auxiliary automatic switch mechanism S as shown particularly in Figure 4. This switching device includes an electromagnet 80, energized by branch leads from circuit 76, 77, which magnet, when energized, pulls down on armature 81 carried by rocker 82, the latter being pivotally mounted, as indicated, on a supporting standard 83 mounted on base 83a, here shown as supported directly on pot magnet 24. Rocking movement of rocker 82, resulting from attraction of armature 81 by magnet 80, brings contactor arm 84 into the path of travel of a pin 16a projecting from one of the revolving weights 16. Upon striking contactor arm 84, the pin 16a throws said arm toward a contact 85 mounted on insulated bracket 85a. Contactor arm 84 is finally brought to, and held against, contact 85 as a result of spring 86 being carried past dead center position for arm 84.

As clearly shown in Figure 4, the contactor arm 84 and contact 85 are connected into the lead 76 feeding one side of the coil of the pot magnet. Arm 84 will of course be understood to be electrically conductive, and to be insulated from the balance of the switching device. The described engagement of contactor arm 84 by pin 16a as the revolving weight 16 passes through the bottom of its path thus finally closes the energizing circuit for the pot magnet, and it will be seen that this switch closure has been timed to occur as the revolving weights pass through the bottom of the stroke, and therefore, at the time that the armature 21 is at the upper end of its stroke. Preferably, the pin 16a is mounted on the weight 16 a little ahead of center, to compensate for the time lag inevitably involved in actuating the switching mechanism and building up the flux within magnet 24.

A similar contactor mechanism is employed in connection with each generator, so that by closing the single main control switch 73, all of the generators are alerted and each one completes its circuit to engage its clutch at the proper time, just as its armature is at its zero velocity position.

To disengage the several clutches, it is only necessary to open switch 73. This deenergizes magnet 80, allowing a strong tension spring 87 to pull down rocker 82 sufficiently far so that contactor arm 84 is clear of the revolving pin 16a. A slack wire 88 connected between arm 84 and standard 83 is of a length to become taut and stop angular travel of arm 84 as spring 87 is pulling down rocker 82. The continued travel of rocker 82 after the angular movement of arm 84 has been thus stopped by wire 88 then causes contact 85 to separate from contactor arm 84, thus breaking the circuit to the pot magnet. The continued travel in a downward arc of contactor arm 84, with horizontal restraint caused by wire 88, causes arm 84 to rotate back on its pivot mounting 84a until spring 86 repasses dead center with arm 84 in open position. Thus the contactor mechanism is cocked open and ready for the next closing cycle upon energization of magnet 80.

It is generally desirable to provide for properly phased engagement of the clutches, but the phase of disengagement is not so important, having little effect on wave form. Of course phased disengagement may be incorporated if desired and such provisions are well within the skill of those familiar with the art. Also, there are a great many automatic sequence relay and electronic circuits known in the art that can be used to accomplish the phased clutch engagement. Also, as a further alternative, I can use an accelerometer or a velocity type electro-mechanical vibration pick-up responding to the oscillation of the generator, instead of to shaft rotation, for actuating the phased switching devices.

Considering the generator, magnetic clutch, and heavy base 39 in more particular, it will be seen that this device comprises a mechanoacoustic transducer heavily weighted or biased against the earth. The elastic nature of the earth structure will then provide a stiffness reactance which, in combination with the overall mass reactance of the transducer assembly and a portion of earth thereunder, will result in a moderate degree of resonance as the generator is driven at resonant frequency. Operation is accordingly preferably adjusted to reach this resonant frequency, giving a much higher power level than would otherwise be achieved. This adjustment is of course readily made by regulating the speed of engine 61 driving alternator 62. Operation of the machine for an initial period will tend to settle and pack the earth. For this initial period of operation, some particular vibration frequency will be found to be of maximum effectiveness. Once the earth has been solidly packed, a different frequency may be found most effective for seismic wave propagation. Adjustment of engine speed at the central power plant is the means of frequency regulation employed for these purposes in this embodiment.

The above mentioned wave generator or mechanoacoustic transducer has been described as independently earth-coupled, and will be seen to follow that it is able, independently of any other transducer, to acquire its own physical magnitude of stroke, which is, of course, largely determined by the reactance of the earth at the immediate locality of the individual transducer. Furthermore, it can be seen that this independent earth coupling permits the generator to individually settle down in accommodation of that particular amount of the above described earth compaction which occurs in the earth region immediately adjacent.

One of the more difficult problems encountered in any seismic system designed for geophysical surveying is that of undesirable reflections at the water table, or lower surface of the over-burden, where there is a large change of acoustic impedance. With my system it is possible to establish a helpful degree of resonance in this region between the radiator and the water table, with resulting improvement in transmission beyond the water table. Resonance under these conditions is accomplished by adjustment of the frequency of the beam generators. When using my pulse technique, the longer the interval of pulse duty the better this resonance phenomenon can be developed.

In some cases, it may be found desirable to employ uninterrupted continuous waves, and in such cases the field winding 26 of the pot magnet will remain continuously energized, thereby continuously coupling the wave generator 10 to the earth. It is one of the primary features of advantage of the present invention, however, that I may employ a "pulse" technique characterized by the generation in the earth of a continuous wave of but a few cycles duration. For this purpose, the central control switch 73 is maintained normally open, permitting the wave generators to run decoupled from their respective magnets, and hence from the radiators 39 and the earth structure. Closure and almost instantaneous opening of control switch 73 will then momentarily couple the generators to the earth's structure, causing a pulse consisting of a few cycles only of wave energy to be delivered from each generator to the earth. For some purposes, as for measurement of the time interval required for the wave pulse to reach a given strata and be reflected to the receiving station, single pulses only may be applied. For other purposes, pulses will be intermittently applied to the earth's structure. For example, the "duty interval" (coupled period) may be of about one-tenth the duration of the time interval between pulses. This duty interval is usually sufficiently short so that the generation is discontinued substantially before the reflected wave arrives at the geophone, thus reducing the complication of direct transmission of "surface" waves from the generator to the geophone. The length of the time intervals between duty intervals has very limited acoustic significance; and is chosen only for convenience in taking data.

Under some circumstances, particularly where a generated wave of narrow frequency band is desired, it is desirable to employ a pulse duty interval of some extended time duration. It is a known fact that a generated wave will initially contain certain extraneous frequencies, and that these will die out and a more nearly pure wave form emerge after a certain time duration. To obtain a "clean" wave pattern, therefore, or in other words, to produce a wave pulse of narrow frequency distribution, the time duration, i. e., duty interval of the pulse, may be lengthened. Such narrow band signals permit the use of sharp tuning microphones having a high ratio of signal to noise.

As earlier stated, directional beam projection is accomplished by using a plurality of generators independently coupled to the earth, with spacing distances between generators at least a substantial fraction of a wave length. In order that these generators will operate at a selected uniform frequency and with a controlled phase relationship, they are provided with a common power plant having a controllably driven common alternator 62, which feeds synchronous motors driving the several wave generators. The several wave generators will always come to rest with their unbalanced weights in the downward position. They will accordingly start together, and, using synchronous drive motors, will swing up and down in unison, excepting as phase differences are deliberately introduced, as described hereinafter. In this connection, I prefer to employ two pole synchronous motors, which will assure preservation of the desired phase relations. Although other means, such as a single motor and a long common drive shaft to several wave generators, may be used to accomplish a common frequency and steady phase, I usually prefer the above arrangement because of its convenience.

The wave generators are normally disposed so as to define a plane. Three points define a plane, and therefore, for this case, a minimum of three generators are disposed on the earth's surface in a triangular relationship with sufficient spacing distance between them relative to a wave length to assure radiation of a plane wave front beam into the earth. Assuming uniform phase relations of the three generators, the three waves generated will coact to form a substantially plane wave beam traveling in a direction normal to the plane defined by the three generators.

Now if any one of the three generators should have its phase advanced by a few degrees over the other two, its wave will reach a given depth in the ground a short time interval ahead of the waves from the other two generators, and the effect is to tilt the composite resulting plane wave front, and to correspondingly shift the angle of projection of the beam from vertical. Obviously, a phase advance of one generator will tilt the beam away from that generator; and correspondingly a phase lag of any given generator will tilt the beam toward that generator. Accordingly by adjustment of the phase, or time interval difference, relationships of the wave generators the beam directions can be controlled at will. It has previously been described how these phase relations are controlled by angular adjustment of the stators of the synchronous motors driving the generators. To facilitate the control of the beam, some indicator means is preferably employed to show the angular disposition of the stator of each synchronous motor. Thus, as indicated in Figure 5, a stationary indicator element 87 may cooperate with a suitably calibrated scale 88 on the movable gear quadrant 55. Although there are available on the market various devices for adjusting the relative angular position of two sections of a drive shaft for other purposes (such as diesel injector timers) I usually prefer the above system of tilting a synchronous motor to accomplish phase adjustment.

Figure 9:
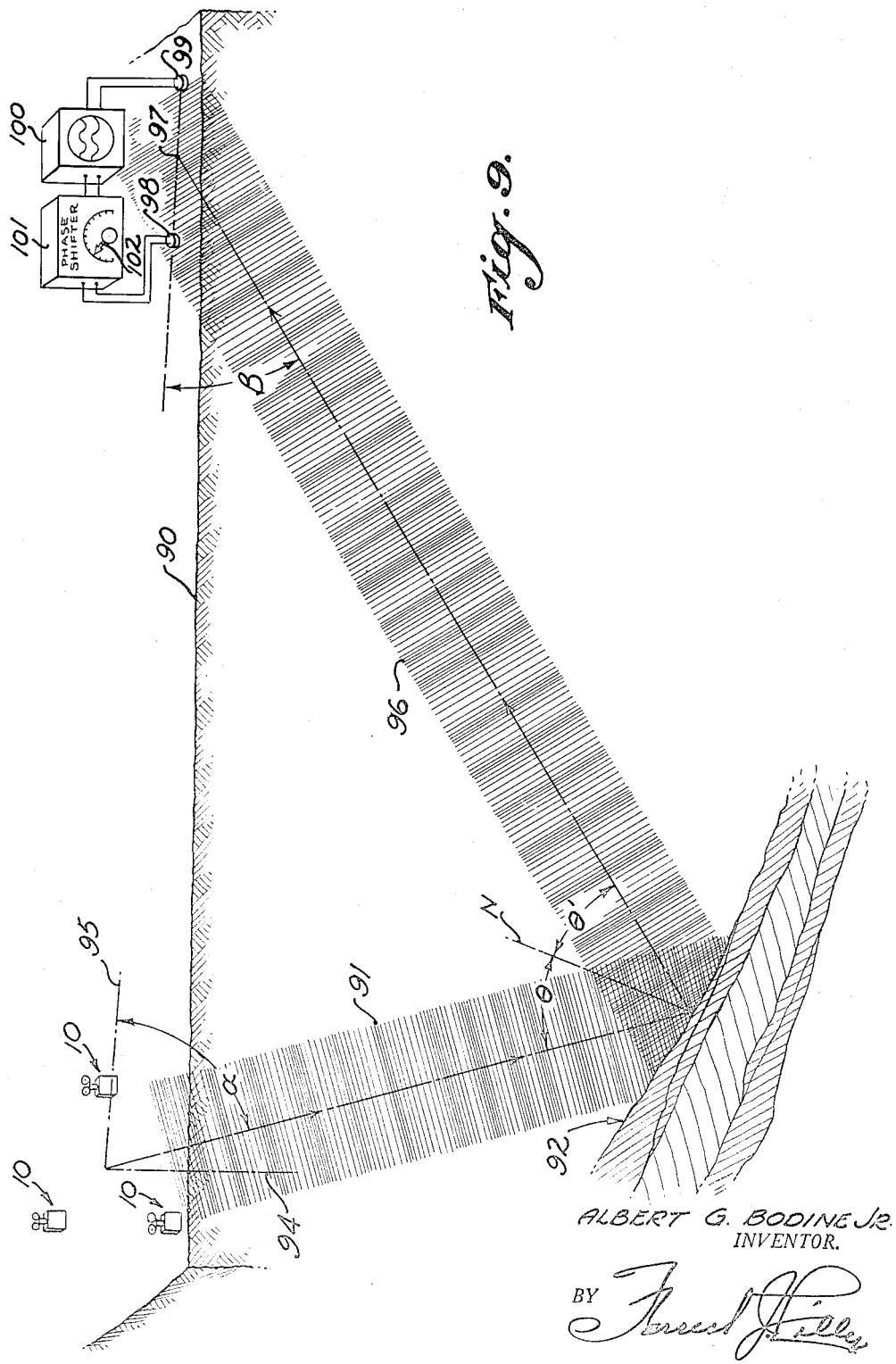
Figure 9 is a schematic view showing wave generating and receiving stations at the earth's surface and showing a typical underlying structure in cross-section.

Figure 9 shows a typical layout of equipment in the field. Three generators 10 are indicated, and are shown to be spaced from one another in a triangular arrangement on the earth surface structure 90. These three generators 10, assumed to be operated from a common power plant of the type indicated in Figure 1, coact when their respective magnetic clutches are energized to generate the flat wave-front beam indicated at 91. This beam 91 is shown as striking underground stratum 92 at the angle $\theta$ with respect to the normal N to the stratum 92 and to be reflected from the stratum at the angle $\theta'$, the angle of reflection $\theta'$ being equal to the angle of incidence $\theta$. As will be seen from the drawing, the transmitted beam 91 is assumed to have been tipped away from the vertical line 94, and to make an angle $\alpha$ with a horizontal line 95. For the simple case here given it is assumed that the transmitted beam 91 and the reflected beam 96 are in a common vertical plane. The horizontal line 95 is then the intersection of this vertical plane with the earth's surface.

The reflected beam 96 will intersect the ground surface at some point 97 spaced a given distance from the cluster of generators 10. This point 97 can be located by means of microphones, and when located, two microphones, or "geophones" 98 and 99 are placed in contact with the ground surface on a line defined by the maximal point of reception of the reflected beam and the effective center point of the array of generators, being thus in the plane defined by the transmitted and reflected beams. For the present simple case this plane is vertical. It will be evident that the reflected beam will then reach one of the geophones 98 ahead of the other geophone 99, and that the phase difference between the electrical output currents of the two geophones will be a function of the angle $\beta$ between the reflected beam 96 and the ground surface. The ground surface stations engaged by the geophones should be level with one another, and if this is not feasible, suitable correction will have to be introduced into subsequent computations.

Various means may be provided for indicating the phase difference of the output currents of the two geophones 98 and 99. I here show for simple illustrative purposes a system in which the two geophones are connected to a dual beam oscilloscope 100, each microphone controlling one of the two beams thereof. Between one of the microphones and the oscilloscope is included a phase shifter 101, having a control 102 for shifting the phase of the electrical current fed to it. By operation of this control 102, the two waves as registered by the dual beam oscilloscope 100 may be brought into phase with one another, and the position of the indicator arm associated with the control 102 will then indicate the number of degrees of phase shift introduced to effect such adjustment. The amount of this phase shift will indicate accurately the angle β for any given spacing distance of the geophones 98 and 99. It is also possible to use a two beam oscilloscope with relatively adjustable sweep travel, thus eliminating the phase shifter 101.

The angle α will of course be known, or may be calculated from the settings of the several synchronous motor stators. Knowing the angles α and β, by a process of simple triangulation, the depth of the stratum 92 may be calculated, and its angle of inclination at the point of beam reflection determined.

The foregoing discussion has assumed that the plane defined by the transmitted and reflected beams will be vertical, and this is of course the simplest case. In practice, the transmitted and reflected beams will more often be in planes at angles other than vertical, but since the direction of propagation of the transmitted beam will always be known, the location of the point on the ground surface at which the reflected beam appears will enable an accurate determination to be made of the plane occupied or defined by the transmitted and reflected beams, and the depth and inclination of the reflecting strata can be determined by triangulation from the resulting data.

Figure 10:
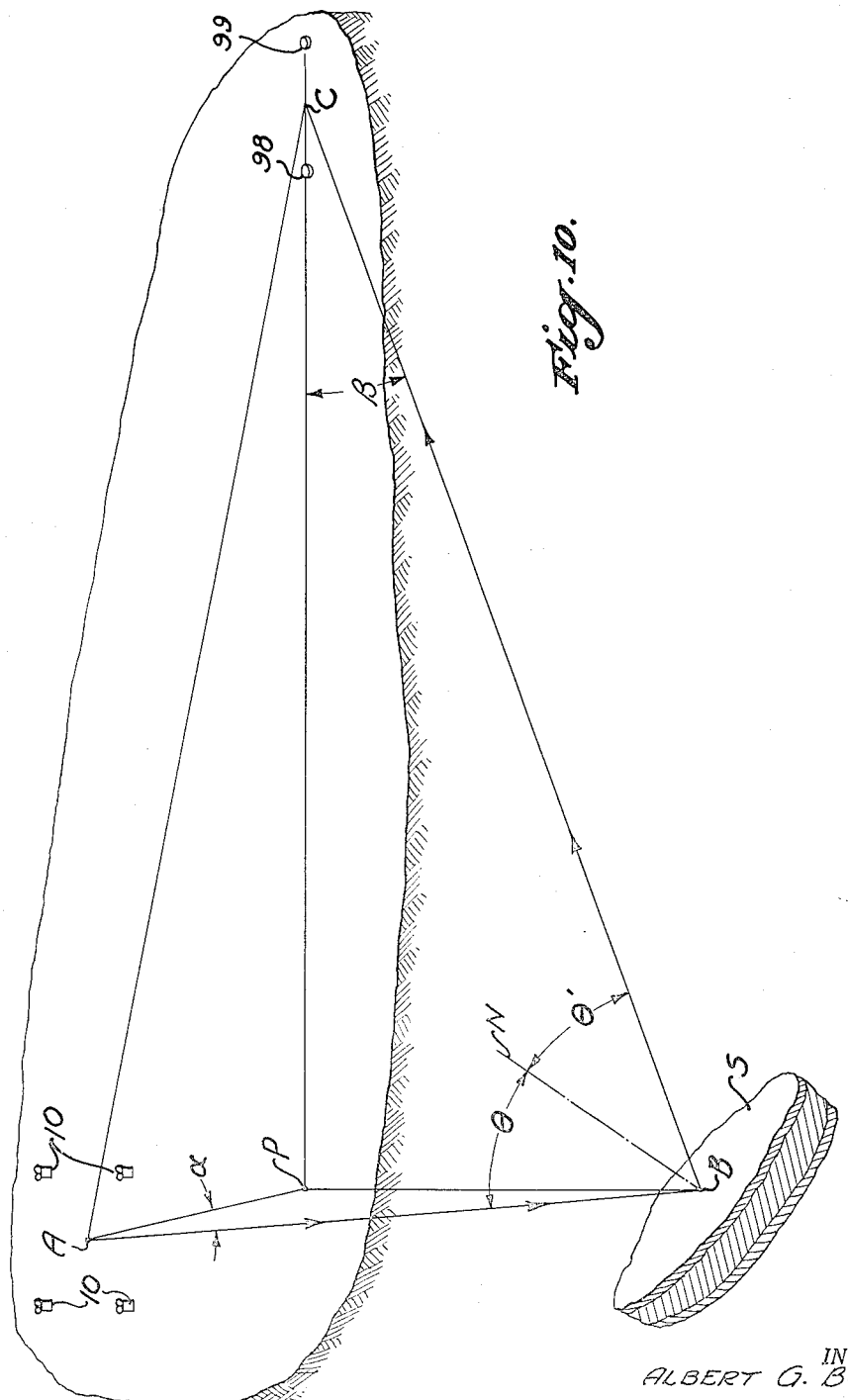
Figure 10 is another schematic view showing a more general case of the system of the invention.

A typical case is diagrammed in Figure 10, where the center point of beam origin is indicated by the letter A, the point of reflection by the tilted underground stratum S by the letter B, and the center point of beam emergence through the ground surface by the letter C. The transmitted and reflected beams follow the direction lines or axes AB and BC, and the points A, B and C define the plane occupied by the transmitted and reflected beam. However, this plane ABC is not vertical in this case. The line AP is a horizontal line defined by the intersection of the vertical plane through AB with the ground surface. Angle α is the angle between this horizontal line AP and transmitted beam axis AB, and this angle α will of course be known from the settings of the motor stators.

The two spaced geophones 98 and 99 should again be placed level with one another, on a horizontal line through the maximal reception point, which is of course point C. In practice, the point C will first be located, and the two geophones will then be placed at spaced apart positions, at fixed spacing distances from point C. They may, though not necessarily, be located on opposite sides of point C. They will then be moved laterally, preserving their fixed spacing distances from point C, until positions are found at which the geophones indicate maximum phase difference. A horizontal line then drawn through the geophones and through the point C should be in the same vertical plane with the reflected beam BC, and should, in fact, represent the intersection of the vertical plane through BC with the ground surface. The described horizontal line through C and the two geophones will evidently intersect horizontal line AP at point P, directly over point B, and the line PB is hence vertical. The angle β which will be determined from the output of the two geophones is clearly the angle between reflected beam axis BC and horizontal line PC.

To complete the triangle APC in the horizontal plane, the line AC may be drawn, and the lengths of all sides of this triangle as well as all of its angles, will of course be immediately obtainable. Triangle ABP is a right triangle, and knowing angle α and the distance AP, the depth of point B, as well as the distance from A to B, can readily be calculated by simple trigonometry. Similarly, knowing angle β and dimensions PB and PC, the depth of point B, and the distance from B to C, can readily be calculated.

Giving attention now to the triangle ABC, all three sides thereof have been determined, and its angle ABC can accordingly be determined. Also, from the previously determined data, it is a simple matter to calculate the angle of tilt of the plane of triangle ABC. Moreover, knowing the angles of incidence θ and reflection θ' to be equal, the inclination and direction of inclination of the normal N (which is obviously in the plane ABC) is readily available. The surface of the stratum S at the point of beam reflection is of course at right angles to the normal N. The precise mode of dealing with the data made available by the present invention can best be left to the preferences of the individual operator, only enough being here given to show how the important reference points and angles can be measured and calculated.

In the immediate foregoing, it has been assumed that the transmitter and receiver station points A and C, as well as the point P, are all substantially in one horizontal plane. Obviously, this cannot always be the case, and in field practice, suitable modifications or extrapolations will be introduced to suit local conditions, as will be readily understood by those skilled in the art.

In cases where it is too difficult to use binaural geophones one can usually obtain enough data for computation by simply measuring the distance of movement of the locus of maximum reception as the angle α is changed.

An accurate determination of the direction of the line BC can sometimes be satisfactorily accomplished without moving the microphones about in an effort to locate an optimum position, if more than two microphones are used. That is to say, since a plane is defined by three or more points, three or more microphones in a planar array fed into an oscilloscope with a corresponding number of controlled sweep beams will give direction in three-dimensional space.

In some cases, it may be possible to obtain sufficiently good readings from the receiving station using uninterrupted continuous waves. However, the use of continuous waves results in the continuous transmission of waves along the ground surface, and the reception of these waves at the receiving station may greatly confuse the reception of the beam reflected from the underground strata. By using the intermittent pulse technique, however, according to which intermittent pulses of a few cycles each are transmitted, the continuous surface waves are not maintained, and the individual pulses can be received at the receiving station without substantial interference by surface phenomena. The preferred operation is accordingly the intermittent transmission of wave pulses of a few cycles' duration each, the time interval between pulses being typically of the order of ten times the duration of a pulse, or at least sufficient to allow each pulse to die out.

Transmission of surface waves can be greatly reduced if their wave length is known and if the relative spacing of the generators and/or microphones is an odd number of half wave lengths as measured along a line which is an extension of or is parallel to the line AC running between the generator and microphone groups.

Measurement of the angle β by the above described procedures thus permits determination of the depth and inclination of a given point on a tilted underground stratum such as 92. By varying the inclination of the angle α, and by corresponding relocation of the receiving station, followed by a determination of the new angle β, other points on the stratum 92 may thus be explored and mapped with greater accuracy than by any procedure heretofore used in the art to my knowledge.

The system also makes available the determination of certain additional data of secondary importance. For example, it is a simple matter to determine the time interval between generation of a pulse and its reception at the receiving station. Knowing the speed of sound in the earth formation involved, the path of travel to and from the point of reflection can then be calculated.

Also, the general nature of the formation of the rock, whether sand, shale, etc., can be indicated by determining the wave frequency best reflected. Furthermore, selection of the duty interval of the wave pulse for optimum reflection will sometimes indicate the general nature of the reflecting surface. For instance, if short duty interval pulses, having a wide frequency distribution or content (as explained hereinabove) give a good reflection, it can be assumed that a sharp discontinuity (quick change in impedance) exists at the reflection plane. This frequency spread can be further extended by changing the basic frequency for the generators. A further significant indication is given when the longer wave lengths are found to be reflected better than the shorter wave lengths, which condition indicates a gradual change in impedance or rock conformation.

A rough or "bumpy" discontinuity, such as a fault, tends to cause scattered reflections of the shorter wave lengths. Here again wave length control is desirable. In passing, it is well to note that for composite media such as earthen structure, the velocity of sound varies with wave length, and undesirable scattering may result if pulses of too short duration are used, this resulting from their wide band frequency content.

In some cases, the earth formation near the ground surface is loose or of bad wave transmission properties, and in such cases I may employ a sub-surface coupler between the wave generator and the earth. Referring to Figure 6, numeral 10 again indicates the wave generator and numeral 24 the coupling magnet. The latter is shown directly mounted on the upper end of a steel column 120 extending down into a hole 121 in the earth, at the bottom of which is located a heavy concrete block 122. The lower end of the steel column 120 is embedded within this heavy block 122. In operation the vibratory forces generated by generator 10 are transmitted through magnet 24 to the column 20 and thence down the latter to the earth coupling means consisting of the block 122. It is found in practice to be an advantage to employ a wave frequency such that a resonant standing wave will be set up in the column 120, with a velocity anti-node appearing in the general location of the block 122. Maximum vibration will then occur at the block and be transmitted to the earth.

The obtainment and use of the desired concentrated directional beam require strict attention to certain acoustic laws. At the outset, the generation of a beam of perfectly parallel rays requires some attention, the tendency being for the wave to flare out in a conical pattern, or in a series of concentric conical beams. This is primarily a function of the number of individual generators forming the array, and the overall area covered thereby. Looked at from the standpoint of the spacing of the individual generators, the spacing becomes critical when made somewhat greater than a wave length, and the energy scattering becomes greater and greater as the spacing distance is increased more and more beyond this critical dimension.

What actually occurs with an individual spacing distance greater than a wave length is the appearance of the phenomena of "side beams." Instead of a single strong "parallel" main beam, there will be a number of additional or secondary beams, of moderate energy level, fanning out from the source at different angles from the main beam, and giving the overall effect of a conical beam of alternating maximal and minimal energy concentration from the main beam axis outward. This phenomenon results from the fact that when two generators are sufficiently spaced, their waves may be in like phase not only in a plane normal to the axis of the main beam, but also in one or more additional planes at angles to the axis of the main beam. This is somewhat analogous to the repeated maxima reflected from an optical grating; in fact, the same mathematical laws apply. This side beam condition is very noticeable when the individual spacing is say ten wave lengths. A side beam maximum occurs less than six degrees from the main beam under such conditions. I have found that the angle $\phi$ between the main beam and the first side beam maximum (with my generator array at the apex) is determined by the equation:

$$\sin \phi = \frac{\lambda}{d}$$

where $d$ is the individual generator spacing distance, and $\lambda$ is the wave length of longitudinal compressional waves in the earth. If the spacing distance "$d$" is only two wave lengths, the first side beam is at 30°, which is at a sufficiently wide angle that it is not likely to be bothersome. Operation with a spacing distance of not greater than about two wave lengths is therefore preferred.

The principal difficulty when side beams occur is of course the fact that the receiving station may pick up a side beam instead of the main beam, and spurious information be gathered.

While it is very desirable to avoid the production of side beams, and particularly those of small angles to the main beam, I have discovered a simple method of distinguishing a side beam from a main beam. If the operator at the receiving station picks up a reflected signal, and wishes to be certain it is the main beam, it is only necessary that the basic frequency at the generator source be varied. A change in frequency will cause a corresponding change in wave length, and, as can be seen from the formula given just above, a pronounced change in the angle of the side beam. However, the direction of the main beam does not change so much with frequency. Thus such a determination of whether or not the beam changes its direction substantially with a change in generator frequency will show immediately whether the beam is the main or a side beam.

It is possible to prevent any deflection at all of the main beam if a compensating correction is made in the relative phase adjustment of the several generators. For instance, if the frequency is increased, the phase angle should be increased, so that the time interval of lag in transmission of any particular point of the cycle is constant. Of course, if there is no initially adjusted phase lag, that is, if the main beam is normal to the generator array, the main beam will not tip at all with frequency change. The side beams, on the contrary, will always swing around considerably with frequency change.

The side beams have an identifying characteristic when my pulse technique is employed. The amplitude of the pulse has a marked stepwise build-up and decay because of the finite difference of arrival time of the different signals from the separate generators in the instance of large angle paths such as are followed by the side beams.

I may mention at this time that I believe the described frequency sensitive side beams to have some value in geophysical prospecting, as they can be detected, evaluated, and information derived therefrom.

The pulse technique as explained hereinabove automatically carries with it a veritable shower of secondary frequencies, analogous to some degree to the secondary frequencies resulting from amplitude modulation of a sine wave. While with the short pulse technique, the main beam will have its otherwise substantially pure sine form, and narrow beam effect greatly distorted, these secondary frequencies result in masking out or obliterating to a very large degree the various distinct side beam maxima that would occur with pure wave generation, leaving the main beam as the only one having a stable and distinctly marked maxima. It is necessary, however, that the pulse have sufficient number of cycles so that the difference in distance from the pick up to each generator is allowed for, with the result that the signal includes all generators. This is particularly helpful to obtain good minima. In view of these frequency effects with pulse technique, it becomes possible in some cases to use individual generator spacings as great as three or four wave lengths.

The tendency for beam flare is dependent upon the area occupied by the total array of generators. This total area should be as large as possible. The equation $$\sin \sigma = \frac{\lambda}{D}$$

gives the angle $\sigma$ for the line diverging from the central maxima axis, along which line lies the minima for the main central beam. D in this instance equals the total spacing distance of the generator array along the earth's surface. If the generators are spaced in an area pattern, D is the effective diameter of that area. It must be recognized that $\sigma$ involves a vertex angle defining a conical pattern and the line of minima is really a family of lines defining the surface of a cone.

It can be seen that D should be as large as possible, so that $\sigma$ will be small; and thus the minima (or die-out region) of the main central beam will lie as close to the central maxima as possible. This makes the beam as concentrated as possible to give sharpness and sensitivity to the practice of the invention.

It can be seen that if "$d$" is to be as small as possible, and D is to be as large as possible, the ideal situation requires a large number of generators of small spacing over a large area. One effective combination is an array of sixteen generators "g" in four rows of four units each (see Figure 7). A circular array is also of value, giving a definite characteristic of energy concentration along a central axis where all pulses are in phase. For example, as shown in Figure 8, an inner circle of four generators "g" may be surrounded by an outer circle of eight generators "g."

A further improvement resides in decreasing the angle $\sigma$ by a system of beam focussing. This I accomplish by setting up an array of generators characterized by a group of outer generators and a group of inner generators; for example, two groups of generators in concentric circles, as indicated in Figure 8. By adjusting the inner generators to operate with a phase lag of a few degrees, for example, by moving back the stators of the synchronous motors driving them through a large number of degrees, the wave front of the beam will be concave, and the wave will be convergent. The system thus behaves as an "acoustic lens," tending to concentrate the beam.

If the beam paths are directed so as not to diverge too far from the normal to the stratum layers, it can be assumed that the beams are moderately straight and not bent by diffraction. Much of the data obtained by this invention can be best analyzed by a simple optical or air transmission acoustic model having a directional source, reflectors, refractors and pick up. This model can be conveniently carried in a small field vehicle.

The system may also be operated in some cases to furnish useful information with but two generator stations, in which case a cylindrical wave front is formed. Such a wave will be reflected by underground strata, and can be received and information obtained therefrom, but the system is inferior to one employing a generator array covering an area so as to define a plane (either flat or curved).

My system of pulse technique (intermittent pulses of a few cycles duration each) is also superior to any prior art practice of which I am aware even if used with but a single generator station. However, in that case, unless the single generator has an earth coupling means or radiator of large area relative to a quarter wave length, directional beam effects will not be obtained, and the handiest data available will be the time interval taken for the wave to reach the reflective strata and return to the ground surface. From this, of course, knowing the velocity of the seismic waves in the earth, the depth of the reflecting strata may be calculated. A single, clean wave, pulse type generator such as shown in Figure 4 can be quite useful by itself if an array of three or more microphones is used for three dimensional directional pick-up, as explained hereinabove. However, I usually prefer the multiple generator system because of the additional wealth of data.

My invention is also applicable to underwater exploration and detection. By mounting the generators on floats, the beam can be directed through the water, swept about through an area of interest, and the reflected beam picked up and analyzed. Such a system is useful for survey of the ocean bottom, and for location of submerged objects, including submarine detection.

It will be understood that the particular embodiment of the invention shown and described herein is for illustrative purposes only and that various changes in design, structure, and arrangement may be made without departing from the spirit and scope of the appended claims.

I claim:

1. Apparatus for seismic wave generation comprising the combination of: an area-defining array of seismic wave generators having a common operating frequency spaced apart over an area of the earth by distances between substantially a quarter wave length and two wave lengths of the seismic waves generated in the earth, so as to produce a directional seismic wave beam, earth coupling means for each of said generators including a massive base member planted in engagement with the earth, clutch means for coupling and decoupling said generators to and from said base members, drive means for driving said generators at a common wave frequency, and means for adjusting the phase relations of said generators to one another to universally tilt said beam.

2. Apparatus for seismic wave beam generation comprising the combination of: an area-defining array of vibratory seismic wave generators spaced apart at least by a substantial fraction of a wavelength in the earth at a common generator operating frequency, so as to produce a directional seismic wave beam, earth coupling means for each of said generators including a massive base member planted in engagement with the earth, means for normally supporting said vibratory generators for vertical oscillation relative to said base members, clutch means for rigidly coupling said generators to said base members, drive means for driving said generators at a common wave frequency, and means for adjusting the phase relations of said generators to one another to universally tilt said beam.

3. Apparatus for seismic wave beam generation comprising the combination of: an area-defining array of vibratory seismic wave generators spaced apart at least by a substantial fraction of a wavelength in the earth at a common generator operating frequency, so as to produce a directional seismic wave beam, earth coupling means for each of said generators including a massive base member planted in engagement with the earth, means for normally supporting said vibratory generators for vertical oscillation relative to said base members, clutch means for rigidly coupling said generators to said base members, means for controlling each clutch means to engage only at times when its corresponding generator is reversing direction at an end of its vertical oscillation stroke, drive means for driving said generators at a common wave frequency, and means for adjusting the phase relation of said generators to one another to universally tilt said beam.

4. Apparatus for seismic wave beam generation comprising the combination of: an area-defining array of vibratory seismic wave generators spaced apart at least by a substantial fraction of a wavelength in the earth at a common generator operating frequency, so as to produce a directional seismic wave beam, earth coupling means for each of said generators including a massive base member planted in engagement with the earth, resilient means for normally supporting said vibratory generators for vertical oscillation relative to said base members, clutch means for rigidly coupling said generators to said base members, drive means for driving said generators at a common wave frequency, and means for adjusting the phase relations of said generators to one another to universally tilt said beam.

5. Seismic wave generator apparatus comprising, in combination, a vibrator, earth coupling means, means for normally supporting said vibrator for vertical vibratory oscillation relative to said earth coupling means, and means for rigidly coupling said vibrator to said earth coupling means.

6. Seismic wave generator apparatus comprising, in combination, a vibrator, earth coupling means, resilient means supported from said earth coupling means for normally supporting said vibrator for vertical vibratory oscillation relative to said earth coupling means, and means for rigidly coupling said vibrator to said earth coupling means.

7. Seismic wave generator apparatus comprising, in combination, a vibrator, earth coupling means including a massive base member in engagement with the earth, means for normally supporting said vibrator for vertical vibratory oscillation relative to said massive base member, and means for rigidly coupling said vibrator to said massive base member.

8. In combination, an electromagnet including a core member having a magnetic gap, a winding for said core member, a body of magnetic fluid in said gap, and a coupling member disposed in said gap and surrounded by said magnetic fluid, said core member comprising another coupling member, and a vibrator coupled to one of said coupling members.

9. In combination, an electromagnet comprising: a core having a hollow shell and a central leg forming a pole piece, a winding around said pole piece, a magnetic gap between said pole piece and said shell, a body of magnetic fluid inside said hollow shell and disposed within said magnetic gap, a vibrator, and a coupling member extending from said vibrator into said magnetic gap and immersed in said body of magnetic fluid.

10. Apparatus for seismic wave beam generation, comprising the combination of: a plurality of spaced-apart seismic wave generators of the continuous wave type, an earth coupling means connected to each of said generators, synchronous alternating current electric drive motors coupled to said generators to drive said generators at a frequency dependent on the speed of said motors, and means for adjusting the phase relations of said generators to one another.

11. Apparatus for seismic wave beam generation, comprising the combination of: a plurality of spaced apart seismic wave generators of the continuous wave type, an earth coupling means connected to each of said generators, synchronous alternating current electric drive motors coupled to said generators to drive said generators at a frequency dependent on the speed of said motors, and means for rotatively adjusting the stators of said synchronous motors relative to one another.

12. Apparatus for seismic wave beam generation, comprising the combination of: a plurality of spaced-apart seismic wave generators of the continuous wave type, an earth coupling means connected to each of said generators, synchronous alternating current electric drive motors coupled to said generators to drive said generators at a frequency dependent on the speed of said motors, means for rotatively adjusting the stators of said synchronous motors relative to one another, a common alternating current generator feeding all of said synchronous motors, and a variable speed internal combustion engine for driving said common generator.

13. The method of seismic wave beam generation and control, that includes: applying sustained seismic wave vibrations of a common frequency to the earth structure at a plurality of stations spaced apart by a distance equal to at least a substantial fraction of a wavelength, whereby to produce a directional seismic wave beam, and controllably varying the phase relations of the vibrations applied to the earth at the different stations relative to one another to controllably tilt the beam.

14. The method of seismic wave beam generation and control, that includes: applying seismic wave vibrations of a common frequency to the earth structure at a plurality of stations spaced apart by a distance between one-quarter wave length and two wave lengths of the seismic waves in the earth, whereby to produce a seismic wave beam and controllably varying the phase relations of the vibrations applied to the earth at the different stations relative to one another to controllably tilt the beam.

15. A geophysical prospecting system comprising the combination of: an area-defining array of seismic wave generators having a common operating frequency spaced apart at least by a substantial fraction of a wavelength in the earth at a common generator operating frequency, so as to produce a directional seismic wave beam, driving means for driving said generators at a common wave frequency, phase adjusting means for adjusting the phase relations of the generators to control the direction of the seismic wave beam transmitted through the earth by said generators, and means for receiving said beam after reflection by an underground stratum including a plurality of geophones engaging the earth at horizontally spaced stations in the region of the point of emergence of the reflected beam from the earth.

16. Apparatus for seismic wave beam generation comprising the combination of: an area-defining array of independently earth-coupled sustained seismic wave generators having a common frequency spaced apart at least by a substantial fraction of a wave length in the earth at said common generator operating frequency, so as to produce a directional seismic wave beam, and means for driving said generators in unison at said common wave frequency.

17. Apparatus for directional seismic wave generation and projection comprising the combination of: an area-defining array of independently earth-coupled sustained seismic wave generators having a common frequency spaced apart by at least a substantial fraction of a wave length in the earth at the common generator frequency, so as to impart a directional property to the combined waves from said plurality of generators, and means for driving said generators at the common frequency.

18. Apparatus for seismic wave beam generation comprising: an array of sustained seismic wave generators of common frequency independently earth coupled at a substantial spacing interval relative to a wave length generated in the earth and disposed relative to each other to define a two dimensional area of the earth's surface, and drive means for driving said generators at said common frequency including generator synchronizing means to produce a seismic wave beam of determined angle relative to the earth's surface.

19. Apparatus for direction controllable seismic wave beam generation comprising: an array of sustained seismic wave generators of common frequency independently earth coupled at a substantial spacing interval relative to a wave length generated in the earth and disposed relative to each other to define a two dimension area of the earth's surface, drive means for driving said generators at said common frequency, all in such manner as to produce a seismic wave beam, and means for adjusting the phase relations of said generators relative to one another to controllably tilt said beam.

20. Apparatus for seismic wave beam generation comprising the combination of: an area-defining array of sustained seismic wave generators having a common operating frequency, said generators being spaced apart at least by a substantial fraction of a wavelength in the earth at said common generator operating frequency, so as to produce a directional seismic wave beam, and means for coupling and decoupling said generators to and from the earth substantially simultaneously with one another.

21. Apparatus for seismic wave beam generation comprising the combination of: an area-defining array of vibratory sustained seismic wave generators having a common operating frequency, said generators being spaced apart at least by a substantial fraction of a wavelength in the earth at said common generator operating frequency, so as to produce a directional seismic wave beam, earth coupling means for each of said generators including a massive base member planted in engagement with the earth, clutch means for coupling and decoupling said generators to and from said base members, drive means for driving said generators at said common wave frequency, and means for adjusting the phase relations of said generators to one another to universally tilt said beam.

22. Apparatus for seismic wave beam generation comprising the combination of: an area-defining array of vibratory sustained seismic wave generators having a common operating frequency, said generators being spaced apart at least by a substantial fraction of a wavelength in the earth at said common generator operating frequency, so as to produce a directional seismic wave beam, earth coupling means for each of said generators including a massive base member planted in engagement with the earth, clutch means for coupling and decoupling said generators to and from said base members, means for operating all of said clutch means simultaneously with one another, drive means for driving said generators at a common wave frequency and means for adjusting the phase relations of said generators to one another to universally tilt said beam.

23. Apparatus for direction controllable seismic wave beam generation comprising: an array of sustained seismic wave generators of common frequency having a substantial spacing interval relative to a wavelength generated in the earth and disposed relative to each other to define a two dimensional area of the earth's surface, means for each generator operable during running of the generator for coupling and decoupling said generator to and from the earth, drive means for driving said generators at said common frequency, all in such manner as to produce a seismic wave beam, and means for adjusting the phase relations of said generators relative to one another to controllably tilt said beam.

24. The subject matter of claim 19, wherein the generator spacing interval is between one-quarter wavelength and two wavelengths of the fundamental seismic waves produced in the earth by said generators.

25. A geophysical prospecting system comprising the combination of: an area defining array of independently earth-coupled sustained seismic wave generators having a common frequency spaced apart by at least a substantial fraction of a wavelength in the earth at the common generator frequency, so as to impart a directional property to the combined waves from said plurality of generators to form said waves into a directional beam, means for driving said generators at said common frequency, and means for receiving said beam after reflection by an underground stratum including a plurality of geophones engaging the earth at horizontally spaced stations in the region of the point of emergence of the reflected beam from the earth.

References Cited in the file of this patent

UNITED STATES PATENTS

| | | |
|---|---|---|
| 1,044,589 | Staley | Nov. 19, 1912 |
| 1,654,014 | Proctor | Dec. 27, 1927 |
| 1,867,098 | Rieber | July 12, 1932 |
| 1,899,970 | McCollum | Mar. 7, 1933 |
| 2,044,807 | Noyes | June 23, 1936 |
| 2,077,707 | Melton | Apr. 20, 1937 |
| 2,156,198 | Scherbatskoy | Apr. 25, 1939 |
| 2,241,874 | Zuschlag | May 13, 1941 |
| 2,249,108 | Beers | July 15, 1941 |
| 2,281,751 | Cloud | Mar. 5, 1942 |
| 2,275,735 | Cloud | Mar. 10, 1942 |
| 2,352,869 | Tolk | July 4, 1944 |
| 2,360,507 | Minton | Oct. 17, 1944 |
| 2,364,209 | Green | Dec. 5, 1944 |
| 2,471,530 | Lobel | May 31, 1949 |
| 2,521,130 | Scherbatskoy | Sept. 5, 1950 |
| 2,545,380 | Poulter | Mar. 13, 1951 |
| 2,556,299 | Scott | June 12, 1951 |
| 2,586,706 | Parr, Jr. | Feb. 19, 1952 |
| 2,630,188 | Hawkins | Mar. 3, 1953 |
| 2,652,530 | Davidson | Sept. 15, 1953 |